United States Patent
Liu et al.

(10) Patent No.: US 8,438,581 B2
(45) Date of Patent: *May 7, 2013

(54) GENERATION OF MENUS FOR MULTIPLE BACK-END SYSTEMS

(75) Inventors: Tse-Hsin Liu, Wellesley, MA (US); Ping Cai, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/618,081

(22) Filed: Dec. 29, 2006

(65) Prior Publication Data

US 2008/0163259 A1 Jul. 3, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/320; 717/115

(58) Field of Classification Search ........... 719/320–321
See application file for complete search history.

(56) References Cited

U.S. PATENT DOCUMENTS

| | | | | |
|---|---|---|---|---|
| 633,263 | A * | 9/1899 | Bowman-Amuah et al. ... | 33/413 |
| 5,907,704 | A * | 5/1999 | Gudmundson et al. ....... | 717/100 |
| 6,769,095 | B1 * | 7/2004 | Brassard et al. ............. | 715/234 |
| 7,178,106 | B2 * | 2/2007 | Lamkin et al. ................ | 715/716 |
| 7,210,094 | B2 * | 4/2007 | Dovin et al. .................. | 715/240 |
| 7,216,303 | B2 * | 5/2007 | Aggarwal et al. ............. | 715/825 |
| 7,275,041 | B1 * | 9/2007 | Cue et al. ....................... | 705/26 |
| 7,392,510 | B1 * | 6/2008 | Treder et al. .................. | 717/128 |
| 7,593,980 | B2 * | 9/2009 | Marascio et al. ............. | 709/201 |
| 7,599,915 | B2 * | 10/2009 | Hill et al. .............................. | 1/1 |
| 2002/0193895 | A1 * | 12/2002 | Qian et al. ...................... | 700/94 |
| 2003/0110296 | A1 * | 6/2003 | Kirsch et al. .................. | 709/246 |
| 2004/0261010 | A1 * | 12/2004 | Matsuishi ................... | 715/501.1 |
| 2005/0209903 | A1 * | 9/2005 | Hunter et al. ...................... | 705/9 |
| 2006/0053376 | A1 * | 3/2006 | Ng et al. ....................... | 715/742 |
| 2006/0200753 | A1 * | 9/2006 | Bhatia et al. .................. | 715/505 |
| 2006/0242557 | A1 * | 10/2006 | Nortis III ...................... | 715/509 |
| 2006/0242598 | A1 * | 10/2006 | Marascio et al. ............. | 715/810 |
| 2007/0038610 | A1 * | 2/2007 | Omoigui ........................... | 707/3 |
| 2007/0061877 | A1 * | 3/2007 | Sima et al. ...................... | 726/12 |

OTHER PUBLICATIONS

Co-pending application, by Chi-Hwei Lin et al., entitled "Asynchronously Generated Menus", filed Dec. 29, 2006, 27 pages.

* cited by examiner

*Primary Examiner* — Cam-Linh Nguyen
*Assistant Examiner* — Mohammad Rahman

(57) ABSTRACT

A system may receive a request for a web page from a client and dynamically generate a document in response to the request. The document may include a reference to a script configured to display a context menu in the web page. The document may further include an encoded value that describes actions that are available for the context menu. The encoded value may be passed to the script as an input parameter when the user requests the context menu. The system may further transmit the document to the client.

20 Claims, 8 Drawing Sheets

GENERATION OF MENUS FOR MULTIPLE BACK-END SYSTEMS

BACKGROUND INFORMATION

Companies that provide services to customers frequently provide their customers with automated techniques for viewing or managing accounts relating to these services. A service company may, for instance, manage a web site designed to allow its customers to login to the web site and view or modify information specific to account(s) maintained with the company.

As an example of such a web site, consider a web portal provided by a telecommunication company for its clients. The telecommunication company may operate a variety of systems and networks, such as legacy systems or networks, that were acquired over the years. A particular customer may have a number of different accounts with the company. For example, a customer may be a large corporation with many divisions, each of which may maintain a different account, such as a different long distance of data service account, with the company. Employees in various ones of the divisions may be given different access privileges to the various accounts.

The web portal may provides menus to an employee that include only information or actions that are applicable to the specific account or employee. In one existing web portal, for example, context menus in the web portal, which show actions available to the employee, are generated via script (e.g., JavaScript) that is downloaded with the web page provided by the web portal, where the rules for displaying the context menus are hard-coded into the script. That is, the rules representing valid actions for a particular account are in the user interface downloaded by the employee.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Techniques described herein may dynamically generate menus that are displayed to end-users accessing a web service. Rules for configuring actions that are to be enabled for a particular account may be stored in a back-end database and dynamically accessed and inserted as an encoded data value into the user interface.

Figure 1:
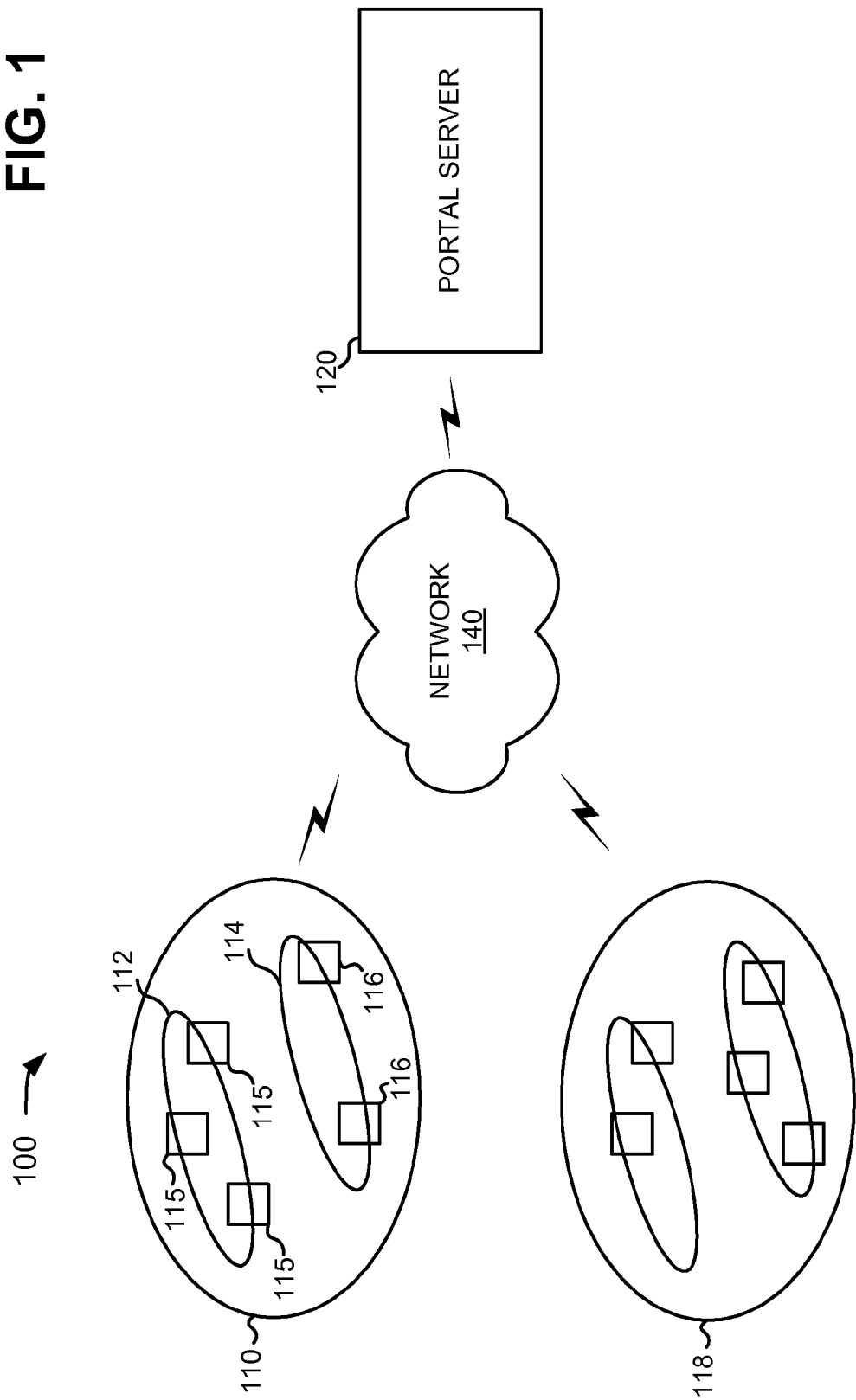
FIG. 1 is a diagram of an exemplary system in which techniques described herein may be implemented.

FIG. 1 depicts an exemplary system 100 in which techniques described herein may be implemented. System 100 may include entities 110 and 118 that connect to a portal server 120 via a network 140. In one implementation, entities 110 and 118 may correspond to customers that wish to access or modify account information provided by portal server 120. The customer may be, for example, a corporation that purchases services from a company associated with portal server 120.

Entities 110 and 118 may include a number of groups or divisions that should each be given different access privileges to portal server 120. For example, entity 110 may be a corporation that includes a number of sections or divisions, such as an accounting section, a customer service section, etc. Various ones of these sections may be associated with different accounts or have different account access privileges associated with the services offered by the company associated with portal server 120. As shown in FIG. 1, for example, entity 110 may include a first division 112 and a second division 114, which may each include client computing devices, such as clients 115 and 116, respectively. Users of clients 115 in division 112 may have different access privileges to the various accounts of entity 110 than users of clients 116 in division 114.

The number of clients, servers, and entities shown in FIG. 1 are exemplary. In practice, there may be more or fewer clients, servers, or entities.

Network 140 may include a local area network (LAN), a wide area network (WAN), a telephone network, such as the Public Switched Telephone Network (PSTN), an intranet, the Internet, or a combination of networks. Clients 115/116 and portal server 120 may connect to network 140 via wired, wireless, and/or optical connections. Each of clients 115/116 may additionally include a web browser (not shown) for accessing and interacting with web sites. Users of clients 115/116 may, for example, use the web browser to interact with portal server 120.

Clients 115/116 may include a device, such as a personal computer, a wireless telephone, a personal digital assistant (PDA), a lap top, or another type of computation or communication device, a thread or process running on one of these devices, and/or an object executable by one of these devices. Portal server 120 may include computing devices and/or software that provides clients 115/116 with access to accounts provided by an entity associated with portal server 120. For example, if the entity associated with portal server 120 is a telecommunications company, portal server 120 may allow customers of the telecommunications company to view and modify information associated with various accounts that the customer has with the telecommunications company. Portal server 120 may include a front-end web server for interacting with clients 115/116 and various back-end components that implement services used by the customer. Portal server 120 will be described in more detail below.

Figure 2:
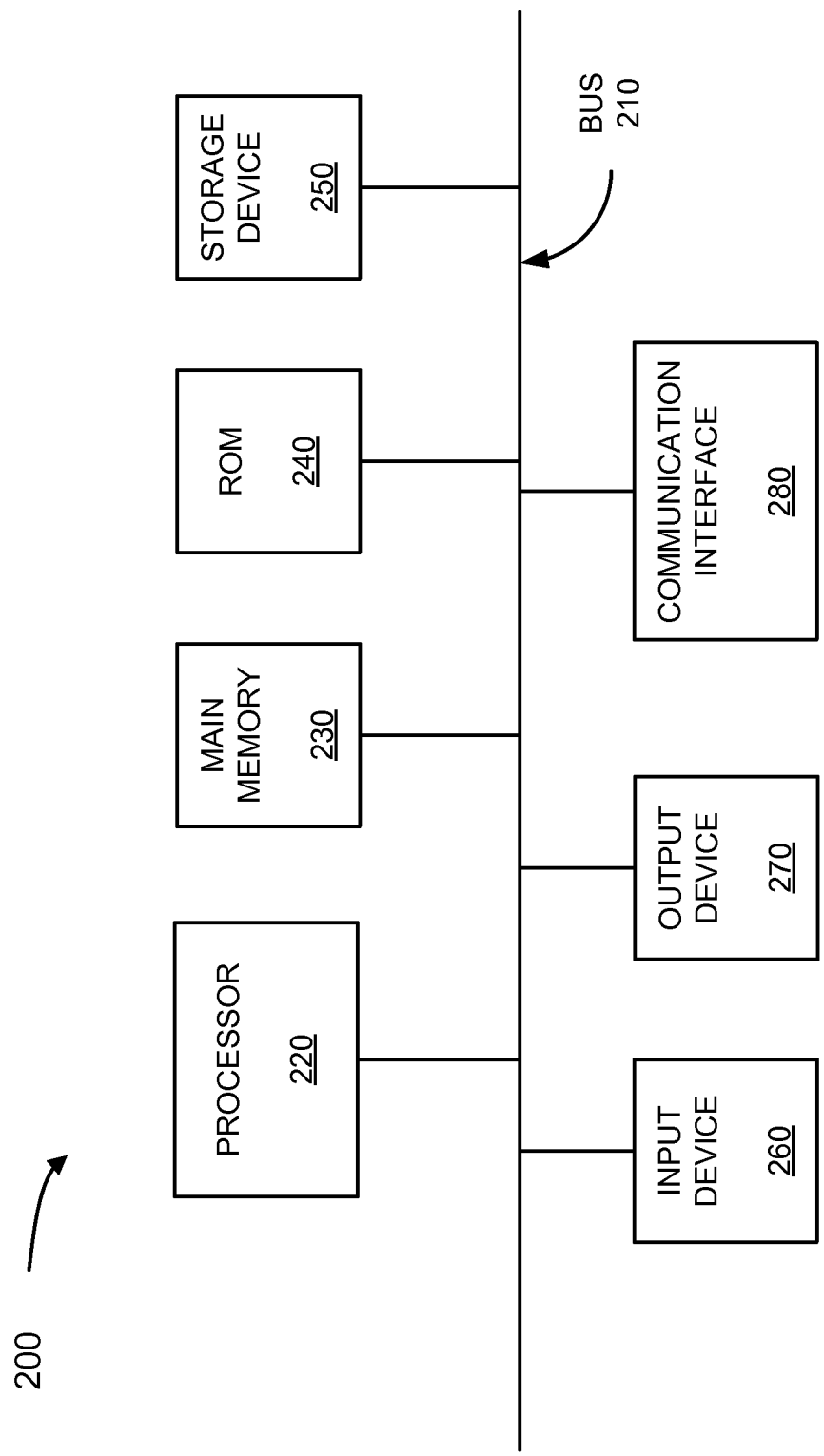
FIG. 2 is an exemplary diagram of a computing device that may correspond to a client or a device included in the portal server shown in FIG. 1.

FIG. 2 is an exemplary diagram of a computing device 200 that may correspond to client 115/116 or a computing device included in portal server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions.

Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into computing device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

Computing device 200 may perform operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
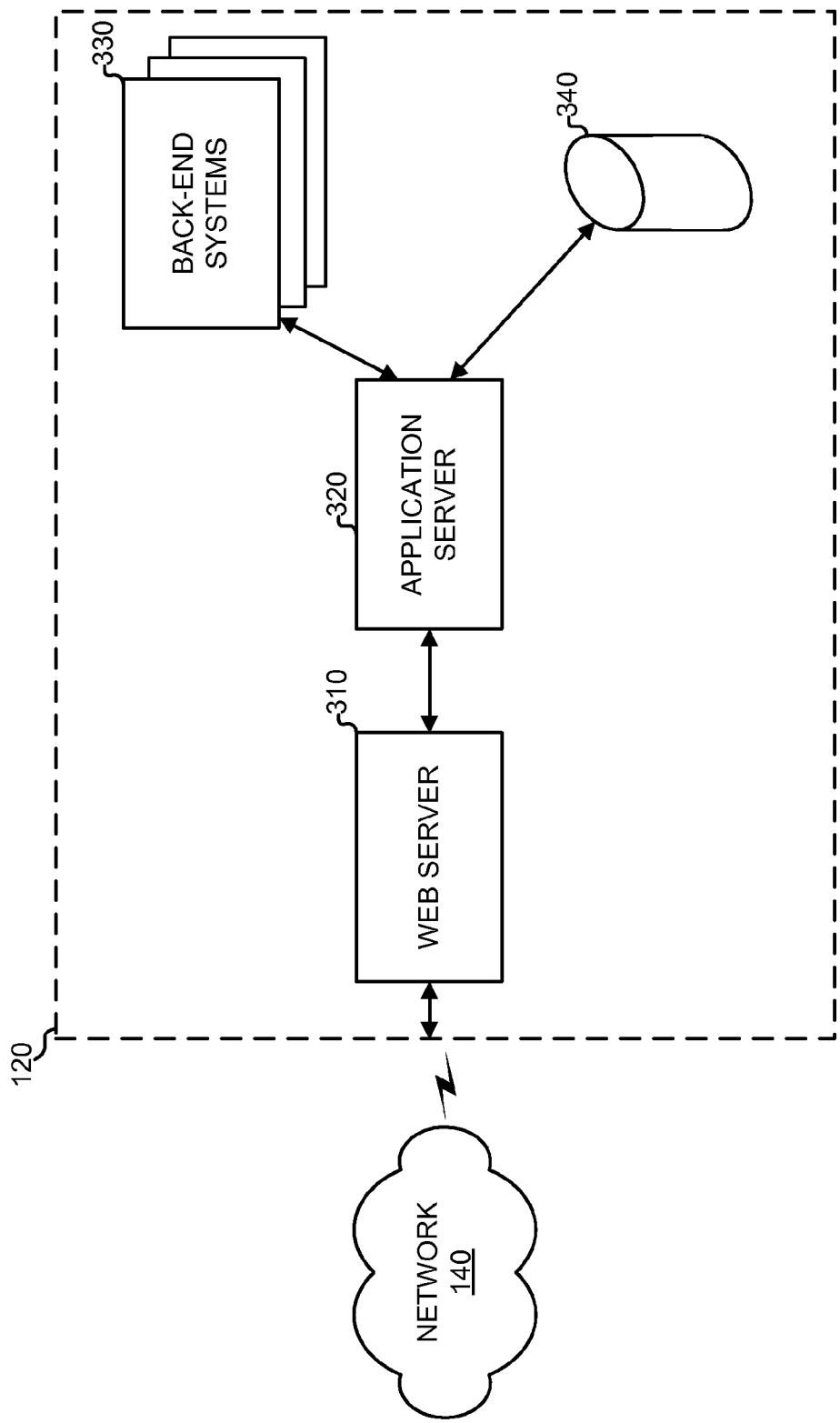
FIG. 3 is a diagram illustrating an exemplary implementation of the portal server shown in FIG. 1.

FIG. 3 is a diagram illustrating an exemplary implementation of portal server 120 in additional detail. Portal server 120 may include a web server 310, an application server 320, back-end systems 330, and a rule database 340. In general, web server 310 may interact with clients 115/116 that are connecting to portal server 120 by providing, for example, hyper-text markup language (HTML) documents (i.e., web pages) that contain information requested by the connecting client 115/116. Web server 310 may dynamically generate menus included in the web pages by accessing application server 320, which may further access back-end systems 330 and rule database 340.

Web server 310 may include one or more software components and computing devices, such as computing device 200, that implements a web server for clients 115/116. Web server 310 may dynamically generate web pages for each client accessing web server 310. In particular, consistent with aspects described herein, web server 310 may transmit HTML documents and script, such as JavaScript, VBScript, or other computer code, to clients 115/116 that include information relating to customer accounts. The script may include script for generating context menus associated with the accounts. In contrast to existing menu generation scripts that may include hard-coded rules that are executed by clients 115/116 to determine which actions are valid for an account, the script transmitted by web server 310 may be a generic menu script that may determine which actions are valid for a particular account based on a parameter (e.g., an encoded data value) passed from web server 310.

Application server 320 may act as a middle layer between web server 310 and between back-end systems 330 and rule database 340. Application server 320 may be implemented using one or more computing devices, such as computing devices 200, that may be implemented in a distributed or scaleable manner. Application server 320 may generally operate to, in response to a request from web server 310, retrieve account information from back-end systems 330, query rule database 340 to determine valid actions for the account, encode the valid actions, and return the encoded valid action information to web server 310.

Although web server 310 and application server 320 are shown as a single "block" in FIG. 3, web server 310 and/or application server 320 may be implemented as one or more distributed or clustered computing devices.

Back-end systems 330 may include one or more systems that provide or administer the services that are to be managed via portal server 120. For example, in the context of the telecommunications industry, back-end systems 330 may include router devices, billing systems, order placement systems, repair systems, or devices for managing such systems. Some of back-end systems 330 may be legacy systems that perform functions similar to newer, non-legacy, ones of the systems.

Rule database 340 may include one or more tables to store data that represents rules relating to the available actions for a given customer account. Rule database 340 may be implemented as, for example, a relational or non-relational database capable of storing and accessing data. Rule database 340 may be implemented on a single computing device or distributed across many computing devices and/or storage devices. In some alternate implementations, rule database 340 may be implemented as a simple "flat" file or other similar structure.

Figure 4:
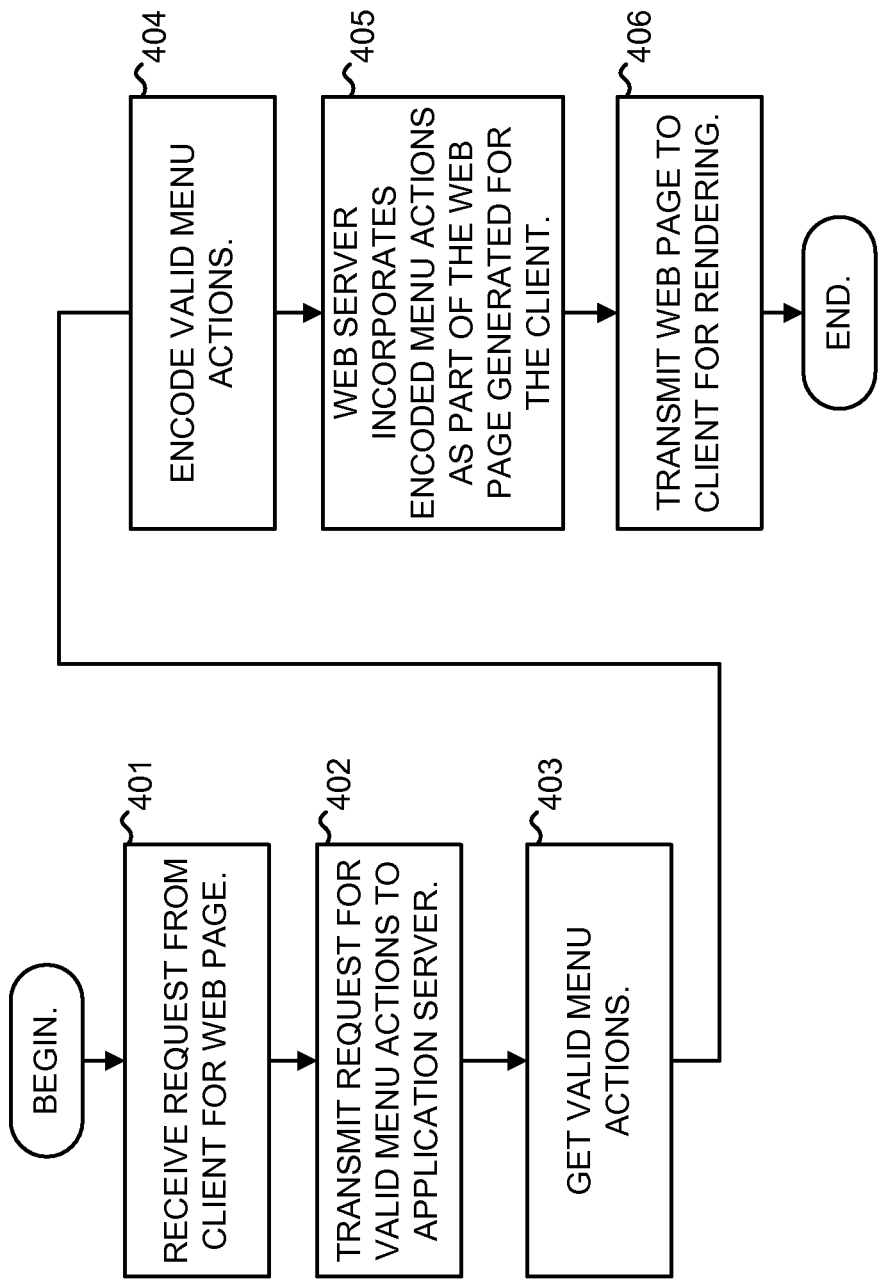
FIG. 4 is a flow chart illustrating exemplary operations performed by the portal server.

The operation of portal server 120 will next be described with reference to FIG. 4. FIG. 4 is a flow chart illustrating exemplary operations that may be performed by portal server 120.

To begin, portal server 120 may receive a request from a client 115/116 for a web page (act 401). The request may be received by web server 310. In some implementations, web server 310 may require the client to login or otherwise authenticate a session with web server 310. In this manner, web server 310 may identify the user and may use the user's identity to determine the access permissions or accounts the user should be allowed to view and/or modify.

As discussed previously, the web page requested by client 115/116 may be a web page that provides information relating to services provided by the entity associated with portal server 120. Contextual menus may be provided in the web page via, for example, a scripting language, such as JavaScript, such that the contextual menus may provide the actions available to client 115/116 when the user selects an account or other item in the web page.

Based on the request received from the user, web server 310 may request the valid account menu actions from application server 320 (act 402). In some implementations, web server 310 may request other account information from application server 320, such as substantive information relating to one or more accounts that is being requested by the user.

In response to the request from web server 310, application server 320 may get the valid menu actions for one or more accounts (act 403). The valid menu actions may be stored in rule database 340. Accordingly, in one implementation, application server 320 may query rule database 340 using parameters associated with the user accessing portal server 120.

Figure 5:
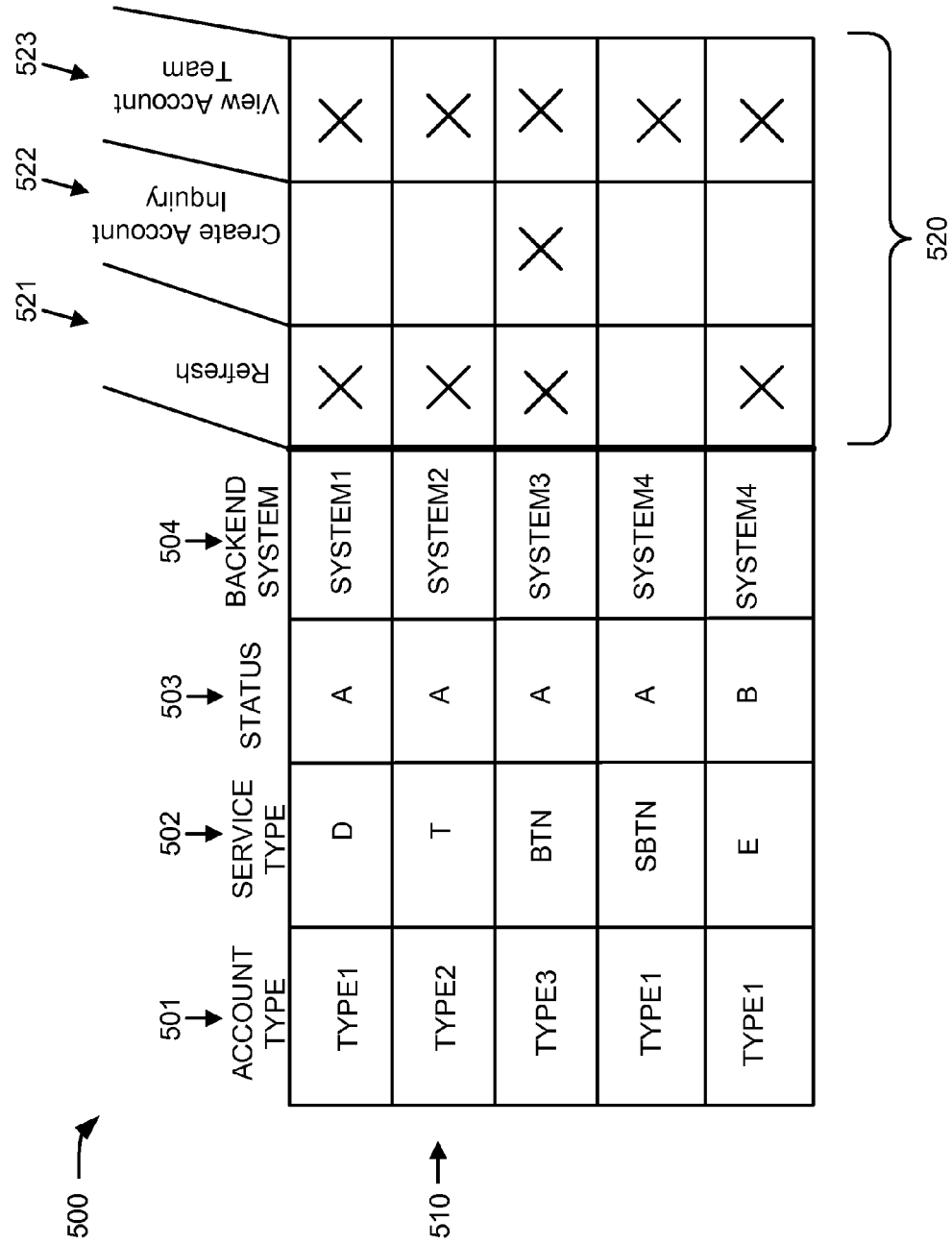
FIG. 5 is a diagram illustrating a portion of an exemplary table in the rule database shown in FIG. 3.

FIG. 5 is a diagram illustrating a portion of an exemplary table 500 in rule database 340. Table 500 may enumerate which menu actions are valid for each of a number of variables associated with the account and/or the user accessing the account. In this example, four variables are used, and are shown as "account type" variable 501, "service type" variable 502, "status" variable 503, and "backend system" variable 504. Account type variable 501 may relate to the type of account, such as whether it is an account for a single user, a specific group, or some other type of account. Account type variable 501 may be specified as, for example, an arbitrary length string. Service type variable 502 may relate to the type of service provided for an account. An arbitrary number of possible different enumerations may be possible for the service type, shown as including service types "D," "T," "BTN," "SBTN," and "E. Status variable 503 may specify an arbitrary code that indicates the status of the account (e.g., status information "A" or "B"). Back-end system variable 504 may identify one or more of back-end systems 330 that are applicable to this account. In this example, a number of back-end systems are listed (e.g., the back-end systems labeled "SYSTEM1," "SYSTEM2," "SYSTEM3," and "SYSTEM4").

As shown in FIG. 5, each row of table 500 lists a specific combination of variables 501, 502, 503, and 504. Row 510, for example, specifies the account variable combination "TYPE2" (variable 501), "T" (variable 502), "A" (variable 503), and "SYSTEM2" (variable 504).

Table 500 additionally includes an account menu action section 520. Account menu action section 520 may include the menu actions that are available for the particular combination of variables 501-504. In this example, three menu actions are shown: "refresh" action 521, "create account inquiry" action 522, and "view account team" action 523. Refresh action 521 may be an action that allows a user to refresh an account view, create account inquiry action may be an action that allows a user to generate an account inquiry, and view account team action 523 may be an action that allows a user to view people assigned to an account. For the variable values shown in row 510, the actions "refresh" 521 and "view account team" 523 are available, while the action "create account query" 522 is not available.

As previously mentioned, the menu actions available for a particular set of variable values may change relatively frequently. Further, the valid sets of enumerated account variable values 501-504 may also change relatively frequently (i.e., either through additions or deletions of a table row). In either case, by presenting the available menu actions in a single rule database 340, administrators can easily update the rule database to reflect these changes.

Although, for illustrative simplicity, four exemplary variables 501-504 and three possible menu actions 521-523 are shown in FIG. 5, it can be appreciated that in practice there may be a number of additional possible menu actions.

The menu actions applicable to a particular combination of variables may be encoded (act 404). As an example of an encoded set of available menu actions, the menu actions corresponding to row 510 in table 500 may be encoded as a three bit encoded value in which each bit represents whether the particular menu action is available. In other words, in the example of row 510, the three bit value "101" may be returned to web server 310, indicating that the first menu action (refresh action 521) is available, the second menu action (create account inquiry action 522) is not available, and the third menu action (view account team action 523) is available. By using only a single bit to store whether a menu action is available, the menu actions for a particular row may be efficiently stored and transmitted to web server 310 and eventually to client 115/116. Although an exemplary three bit encoded value was described above, in one implementation, a 64-bit (eight byte) value may be used, which includes enough bits to represent 64 possible menu actions. An eight byte value corresponds to a java long data type, and accordingly, the encoded value can be efficiently passed between processes as a long data type value.

Web server 310 may receive the encoded menu actions and incorporate the encoded menu actions into the web page that is to be sent to the client (act 405).

Figure 6:
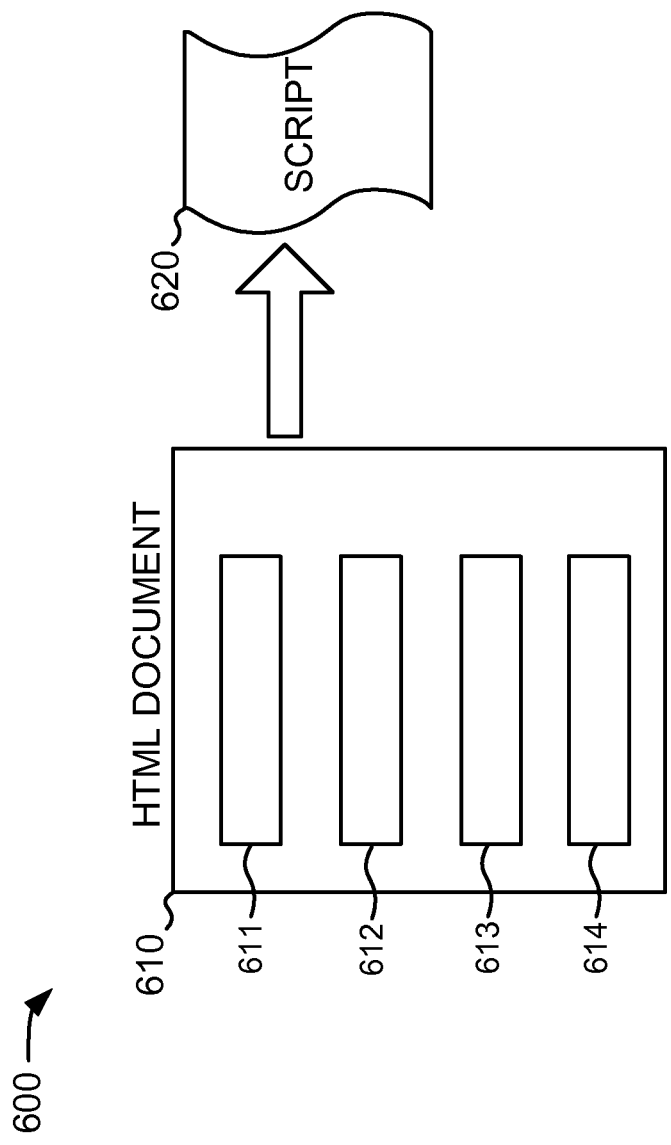
FIG. 6 is a diagram conceptually illustrating an exemplary web page.

FIG. 6 is a diagram conceptually illustrating an exemplary web page 600 generated in act 405. Web page 600 may include an HTML (hyper-text markup language) document 610 that is sent to client 115/116 in response to the request from the client. Document 610 may include a reference to a script 620. When parsing HTML document 610, client 115/116 may identify the reference to script 620 and subsequently download script 620. Script 620 may be a generic menu generation application that can potentially be sent to all clients making requests to web server 310 of portal server 120.

HTML document 610 may additionally include references 611 through 614 to various accounts in which the requesting client 115/116 is interested. For example, each of references 611 through 614 may include an HTML anchor element that includes a description of the account, such as an account number or string, and a link that includes the encoded value from act 404. When the user selects or clicks on one of references 611 through 614, script 620 may be called and the encoded value passed as a parameter to script 620. Script 620 may then use the parameter to display a context menu for the particular account that includes the valid menu actions defined by the encoded value. Script 620 may include routines for displaying all possible menu actions but may only actually use the routines indicated by the encoded value. Also, because the encoded value passed to script 620 is stored locally within document 610, script 620 may not need to make a remote procedure call to portal server 120 when implementing the context menus, which can improve performance and reliability of the system.

Figure 7:
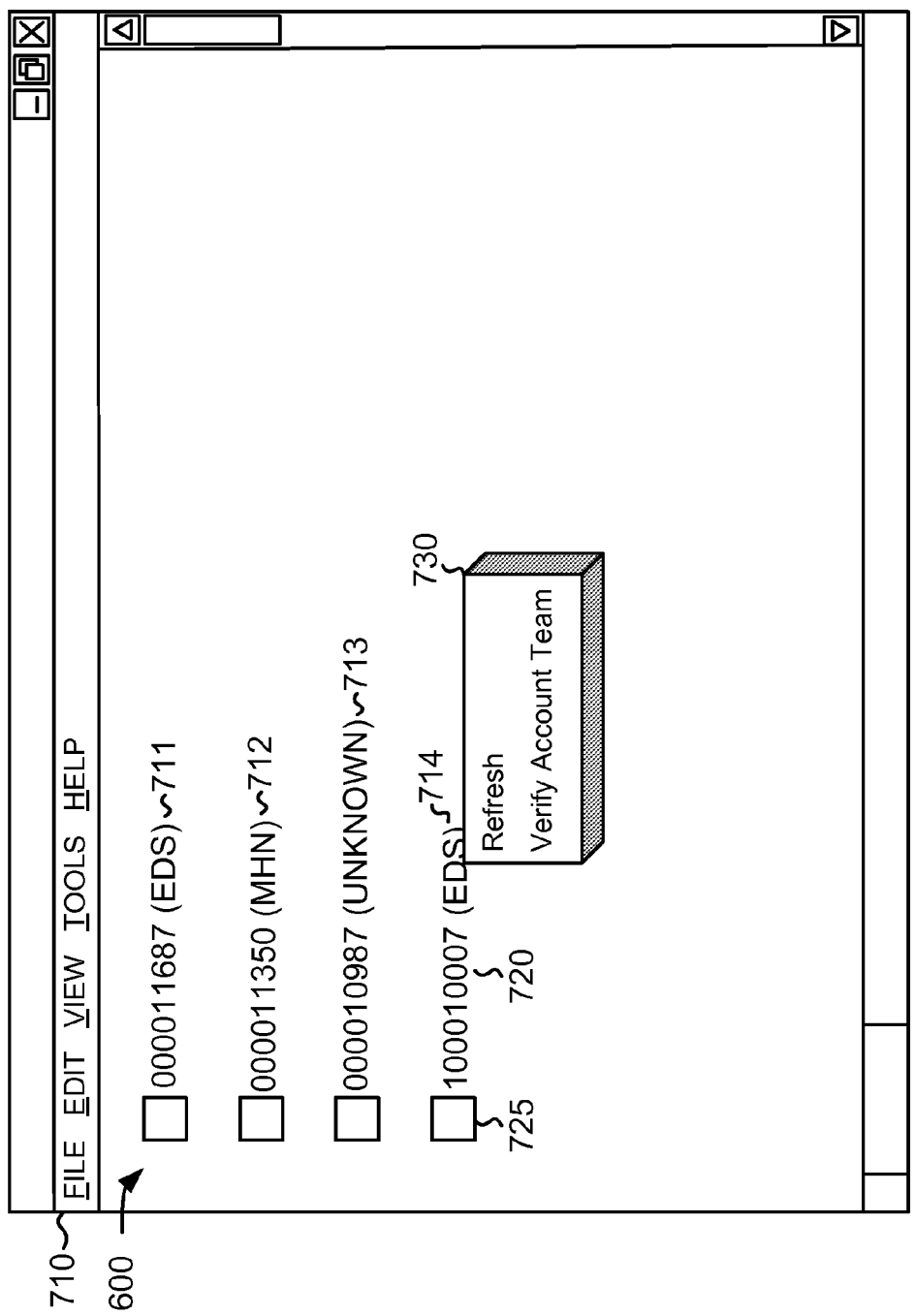
FIG. 7 is a diagram illustrating an exemplary rendered version of the web page shown in FIG. 6.

Referring back to FIG. 4, client 115/116 may receive and render the downloaded web page for the user (act 406). FIG. 7 is a diagram illustrating an exemplary rendered version of web page 600. More specifically, as shown in FIG. 7, a web browser that includes a browser window 710 may render web page 600. References 711 through 714 in web page 600 may be displayed to the user as different strings that identify different accounts that the user may select. Assume that the user wishes to perform an action relating to account 714 (account "100010007"). The user may, for example, select or click on text 720 or on check box 725 associated with account 714. In response, script 620 may generate context menu 730 that displays the actions applicable for account 714. In this example, assume that the encoded value indicates that two actions are enabled for this account: "Refresh" and "Verify Account Team." Script 620 may display these actions in context menu 730. Script 620 may refrain from displaying possible menu actions that are not enabled for the account or may not display disabled actions using a font that indicates that the action is not enabled.

In the above discussion of acts 403 and 404, application server 320 was described as interacting with rules database 340 on a per-account basis. In an alternate implementation, application server 320 may store a local version of rule database 340 in a hash table. This implementation can increase the performance of portal server 120 by substituting fast hash table look-ups for queries to rule database 340.

Figure 8:
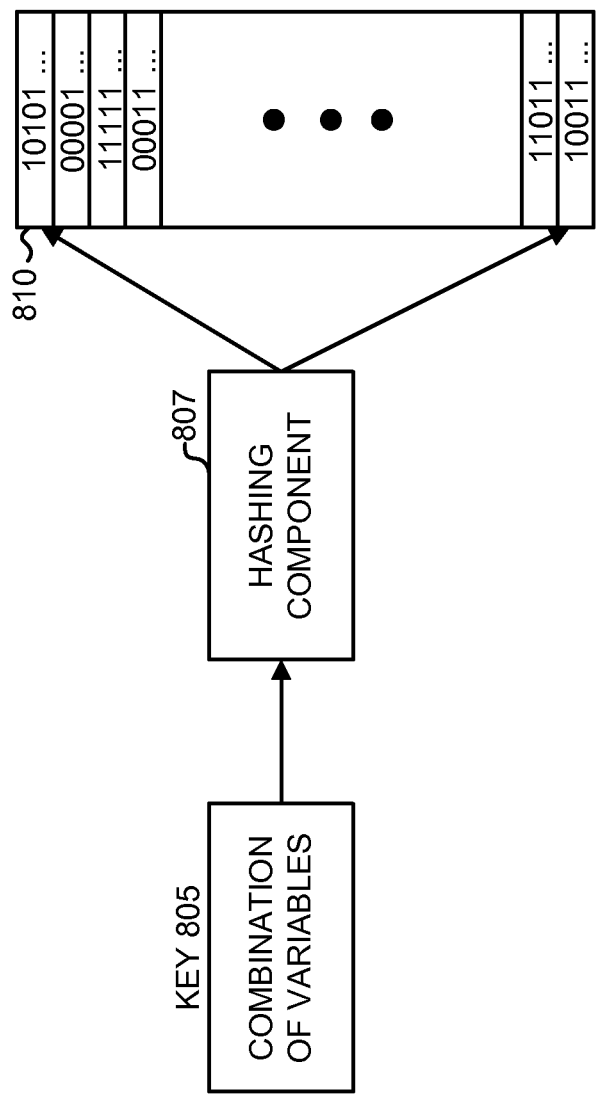
FIG. 8 is a diagram conceptually illustrating an implementation in which the application server shown in FIG. 3 stores a local version of a rule database in a hash table.

FIG. 8 is a diagram conceptually illustrating an implementation in which application server 320 stores a local version of rule database 340 in a hash table. Application server 320 may use a combination of variables 501-504, labeled as key 805, as a key to hash table 810. For example, each key 805 may be a simple concatenation of the values of variables 501-504. For example, for the value of variables 501-504 shown in row 510 of table 500 (FIG. 5), the key may be "TYPE2 T A SYSTEM2." Each key may be hashed by a hashing component 807 to generate an index into hash table 810. Hashing algorithms are known and many suitable hashing algorithms may be used by hashing component 807. Each location in hash table 810 may store the encoded menu action value corresponding to the input combination of variables. Because the hash operation performed by hashing component 807 is a relatively computationally fast operation, looking up any set of variable values 501-504 can be performed quickly by application server 320. Further, because each of the encoded values are efficiently stored as a relatively small data type (e.g., as a long data type), the memory footprint of hash table 810 in application server 320 can be relatively small.

Systems and methods described herein may enable web pages including context sensitive menus to be provided to end-users without embedding software rules for displaying menu actions in the user interface sent to the users. Instead, the rules may be defined in a database and dynamically accessed and represented as a data value that may be included in the web page sent to the end-user. Errors and maintenance difficulties encountered with manually maintaining menu generation rules in code in the user interface can be reduced while providing for the efficient and dynamic generation of possible menu actions at the server. For example, changes to the menu generation rules in the rule database can be easily implemented. Additionally, application server 320 can be easily scaled to accommodate a large number of users.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowchart of FIG. 4, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device, the method comprising:
storing, by the device and in a memory, rules that describe available actions for different combinations of variables describing a client or an account associated with the client;
receiving, at a processor of the device and from the client, a request for a web page;
accessing, by the processor and based on receiving the request, the rules in the memory;
dynamically generating, by the processor and based on accessing the rules, a document, the document including:
a reference to a script to display a context menu in the web page, and
an encoded value that describes actions that are available for the context menu,
the encoded value being based on the accessed rules,
the encoded value being passed to the script as an input parameter when the client requests the context menu; and
transmitting, by the processor, the document to the client.

2. The method of claim 1, where the encoded value defines available actions that are to be displayed in the context menu.

3. The method of claim 1, where the request is for a web page that includes information relating to a plurality of accounts associated with the client, each of the plurality of accounts being associated with a context menu.

4. The method of claim 1, where accessing the rules includes:
transmitting a request for valid menu actions to an application server; and
looking up, in a hash table, the encoded value at the application server.

5. The method of claim 4, where looking up the encoded value includes:
generating a key for the hash table as a combination of a plurality of the variables, and
using the key to look up the encoded value.

6. The method of claim 5, further comprising:
obtaining at least one of the plurality of variables from a back-end system.

7. The method of claim 1, where the encoded value uses a single bit to represent whether each of the actions are available for the context memory.

8. A system comprising:
a memory to store at least one table that includes rules relating to actions available for accounts associated with a client; and
an application server to:
receive requests from a web server for actions associated with a first account, of the accounts, associated with the client,
the client requesting a web page, from the web server, the web page that includes information about accounts associated with the client,
retrieve, from the memory, a data parameter indicating menu actions that should be displayed for the first account, and
transmit the data parameter to the web server,
the application server receiving, from a back-end system, information relating to services associated with the first account.

9. The system of claim 8, where the at least one table stores menu actions that are available for the accounts given a set of values for a plurality of variables associated with the accounts or the client.

10. The system of claim 8, where the application server is further to:

send the data parameter to the web server for generating a document including the data parameter and a reference to a script to display a context menu including actions enabled by the data parameter.

11. The system of claim 10, where the menu actions are displayed, in the document, based on a script.

12. The system of claim 11, where the script causes the menu actions to be presented as a context menu that is displayed based on selection of the first account.

13. The system of claim 8, where the application server is to retrieve the data parameter from a hash table stored locally at the application server.

14. The system of claim 13, where the application server is further to generate a key for the hash table as a combination of a plurality of variables associated with the accounts.

15. The system of claim 14, where the application server is further to obtain at least one of the plurality of variables from the back-end system.

16. The system of claim 8, where the application server is to retrieve the data parameter by querying the memory.

17. The system of claim 8, where the data parameter uses a single bit to represent whether an action is available in the menu.

18. A device comprising:
   means for storing, in a memory, rules that describe available actions for different combinations of variables describing a client or an account associated with the client;
   means for receiving, from the client, a request for a web page;
   means for accessing, based on receiving the request, the rules in the memory;
   means for dynamically generating, based on accessing the rules, a document, the document including:
      a reference to a script to display a context menu in the web page, and
      an encoded value that describes actions that are available for the context menu,
      the encoded value being based on the accessed rules,
      the encoded value being passed to the script as an input parameter when the user requests the context menu; and
   means for transmitting the document to the client.

19. The device of claim 18, where the means for accessing the rules includes:
   means for transmitting a request for valid menu actions to an application server; and
   means for looking up the encoded value in a hash table at the application server.

20. The device of claim 19, where the means for looking up the encoded value includes:
   means for generating a key for the hash table as a combination of a plurality of variables; and
   means for using the key to look up the encoded value.

* * * * *